US007314160B2

(12) United States Patent
Yoshida et al.

(10) Patent No.: US 7,314,160 B2
(45) Date of Patent: Jan. 1, 2008

(54) AUTOMATIC MONEY TRANSACTION MACHINE

(75) Inventors: Kazushi Yoshida, Chiyoda (JP); Yoshiyuki Oomori, Owariasahi (JP); Junichi Tamamoto, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 1372 days.

(21) Appl. No.: 10/202,629

(22) Filed: Jul. 25, 2002

(65) Prior Publication Data

US 2003/0019715 A1 Jan. 30, 2003

(30) Foreign Application Priority Data

Jul. 30, 2001 (JP) ............................ 2001-229045

(51) Int. Cl.
*G06F 17/00* (2006.01)
*G07F 19/00* (2006.01)
*G06K 13/00* (2006.01)

(52) U.S. Cl. ...................... 235/379; 235/375; 235/475

(58) Field of Classification Search ................ 235/379; 705/35, 43, 45; 902/7-9, 12-17
See application file for complete search history.

(56) References Cited

U.S. PATENT DOCUMENTS 5,173,590 A * 12/1992 Nakano et al. ............. 235/379
5,986,457 A * 11/1999 Kayani ....................... 324/671
2002/0014736 A1* 2/2002 Katou et al. ................ 271/126

FOREIGN PATENT DOCUMENTS

CN 1198232 A 11/1998
JP 2000-268225 9/2000

* cited by examiner

*Primary Examiner*—Thien M. Le
*Assistant Examiner*—April Taylor
(74) *Attorney, Agent, or Firm*—McDermott Will & Emery LLP

(57) ABSTRACT

An automatic money transaction machine, which is small in size, to be able to detect a state of a tear in a bill with good accuracy and gives good service and no discomfort to a customer, includes a receipt/payment opening 4, a discriminating unit 6, a temporary accumulation section 8, and a bill discriminating device 20 for discriminating a state of a bill. The bill discriminating device 20 includes an energizing drive device provided on a conveyance path 5 between the receipt/payment opening 4 and the temporary accumulation section 8 for application of tensile or compressive forces in a direction horizontally perpendicular to a direction of conveyance in a plane of a bill, and a bill image acquiring device 53, such as image sensors, imagers or the like, provided close to the energizing drive device for acquiring an image of a bill, to which tensile or compressive forces are applied by the energizing drive device. A state of a bill is distinguished on the basis of bill image data acquired by the bill image acquiring device 53, and gates 7A, 7B are switched over in accordance with the distinguishing result and the result from the discriminating unit 6.

14 Claims, 7 Drawing Sheets

AUTOMATIC MONEY TRANSACTION MACHINE

BACKGROUND OF THE INVENTION

The invention relates to an ATM (Automated Teller Machine), that is, an automatic money transaction machine, and more particular, to an automatic money transaction machine, in which a state of a bill being partly torn is discriminated with high accuracy and a process conformed to a state of a bill having been discriminated is performed.

In conventional automatic money transaction machines, there have been proposed techniques for discriminating and processing a bill in a bad state (bills having a high degree of fatigue and many wrinkles, old bills and the like). Also, JP-A-2000-268225 shows an arrangement, in which forces are applied in a direction perpendicular to a plane of conveyance to thereby spread and detect a tear.

SUMMARY OF THE INVENTION

In recent automatic money transaction machines, ordinary bills cause little obstacle such as jam or the like owing to an improvement in various techniques associated with handling of bills. However, bills put in a state of decreased rigidity and partly torn due to excessive use are liable to cause an obstacle. With a view to enhancement in reliability, there is performed a process for discriminating bills having been exhausted to be low in rigidity and partly torn are and rejecting bills put in a bad state, but any process for accommodating a tear present in a bill is not taken into account.

Detection and rejection of a bill having a tear are described in JP-A-2000-268225, in which a tear present in a bill is largely opened and detected and in which forces are applied in a direction perpendicular to a plane of conveyance to spread the tear, so that modification of a constitution of a machine necessitates a large modification in an arrangement, of which realization leads to an increase in cost. In particular, taking account of a tendency to miniaturization and cost reduction of automatic money transaction machines in recent years, it is required that the above discriminating means itself be realized to be small in size and low in cost.

Further, an arrangement, in which bills having a tear tending not to cause an obstacle in a machine are rejected (returned to a customer) upon depositing money, puts a customer to much unkindness and poor service. On the other hand, an arrangement, in which bills having a tear tending not to cause an obstacle in a machine are paid to a customer, causes a problem of giving much discomfort to the customer.

An object of the invention is to solve the above problems and to provide an automatic money transaction machine, which is small in size to be able to detect a state of a tear in a bill with good accuracy, and gives good service and no discomfort to a customer.

To attain the above object, an automatic money transaction machine according to the invention specifically comprises a receipt/payment opening, a discriminating unit for deciding truth or falsehood of bills, a temporary accumulation section for temporarily storing bills as deposited, energizing drive means provided on a conveyance path between the receipt/payment opening and the temporary accumulation section for application of tensile or compressive forces in a direction horizontally perpendicular to a direction of conveyance in a plane of a bill, bill image acquiring means, such as image sensors, imagers or the like, provided close to the energizing drive means for acquiring an image of a bill, to which tensile or compressive forces are applied by the energizing drive means, and state discriminating means for discriminating a state of a bill on the basis of bill image data acquired by the bill image acquiring means. Also, a range of bill image data used in discrimination of the state of a bill is variable at the time of counting (counting mode) and at the time of storage (storing mode).

Other objects, features and advantages of the invention will become apparent from the following description of the embodiments of the invention taken in conjunction with the accompanying drawings.

DESCRIPTION OF THE EMBODIMENTS

Figure 1:
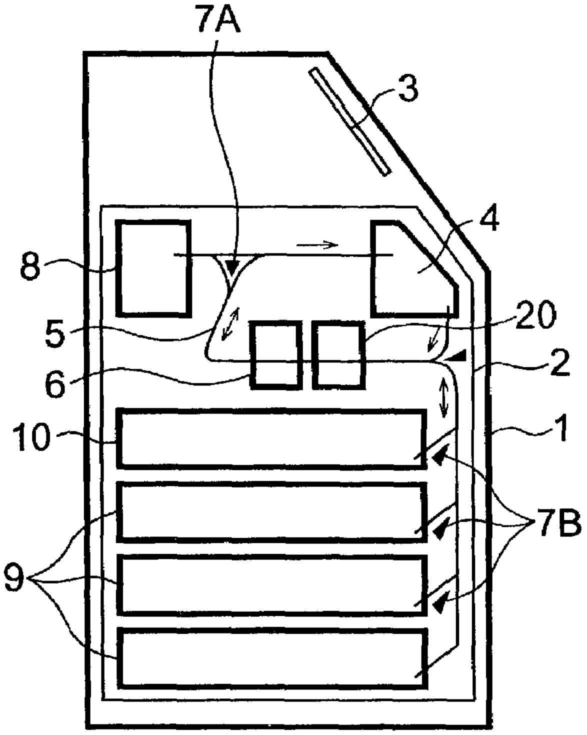
FIG. 1 is a schematic view showing an exemplary construction of an automatic money transaction machine (ATM) 1.

FIG. 1 is a schematic view showing an exemplary construction of an automatic money transaction machine (referred below to as "ATM") 1 according to the invention.

An explanation will be given below to respective elements of the ATM 1 and actions thereof with reference to FIG. 1.

The ATM 1 is composed of a plurality of modules, FIG. 1 showing a bill handling device 2 and an input/output device 3. The bill handling device 2 performs processes for handling bills, for example, processes of receipt and payment of bills. The input/output device 3 is composed of, for example, a combination of a monitor (display) and push buttons (input unit), a touch panel, in which a monitor and push buttons are united, or the like. The input/output device 3 allows an operator of the ATM 1 to select a process such as receipt and payment of bills and to make input, or gives a guidance to an operator. Moreover, there are in some cases a module for handling cards, a module for handling bank-books, a module for handling coins, and so on.

When depositing bills, an operator selects a receipt process with the use of the input/output device 3. Upon this selection, a shutter at a receipt/payment opening 4 is opened, and bills in a bundle are thrown in by an operator. In the receipt/payment opening 4, a mechanism such as delivery rollers with rubber provided at their peripheries separates and draws out bills one by one to deliver them to a conveyance path 5. The conveyance path 5 is composed of, for example, belts, rollers or the like to interpose bills therebetween to convey them attributable to movements or rotation of belts or rollers. On the basis of optical or magnetic features of bills being conveyed, a discriminating unit 6 decides truth or falsehood of the bills.

Here, bills decided to be inappropriate for transaction because of being small in area due to falsehood or a tear are returned to the receipt/payment opening 4 by switching of a gate 7A toward the receipt/payment opening 4. On the other hand, regular bills decided to be capable of transaction are temporarily stored in an accumulation section 8. In the case where an operator uses the input/output device 3 to perform confirmation of an amount of money and instruct input, bills having been temporarily stored in the accumulation section 8 are taken out and conveyed to an accumulation section or sections 9 via the conveyance path 5. In the case where the accumulation sections 9 are plural in number, gates 7B are switched to cause bills to be stored in separate accumulation sections 9, for example, every kind of bill.

On the other hand, at the time of payment of bills, an operator selects a payment process with the use of the input/output device 3. The accumulation sections 9 take out the number of bills as instructed to send the same to the conveyance path 5. Bills having been decided to be inappropriate for payment when passing through the discriminating unit 6 are temporarily stored in the accumulation section 8 upon switching of the gate 7A toward the accumulation section 8. On the other hand, bills having been decided to be appropriate for payment are stored in the receipt/payment opening 4. After storing a predetermined number of bills, the receipt/payment opening 4 causes the shutter to be opened to put the bills in a state, in which they can be delivered to an operator. Also, bills having been decided to be inappropriate are temporarily taken out from the accumulation section 8 and stored in a reject accumulation section 10.

In the ATM 1, processes of receipt and payment of bills are performed by the actions outlined above.

An especially high reliability is demanded for such ATM 1 by virtue of circumstances, in which bills themselves being cash are handled, and circumstances, in which bills are handled in unmanned shops or in a state of use for the 24-hour operation. Since such ATM 1 is an apparatus for handling old and new bills of various kinds circulating generally, however, bills in a bad state are frequently present among bills being handled. In particular, bills having become small in rigidity and caused a tear have a high possibility that an obstacle such as jam of bills or the like is caused at the time of conveyance and accumulation.

This is because, for example, at the time of conveyance, a torn portion or portions of a bill are caught by a conveyance guide to dwell and a bill having a small rigidity undergoes buckling to be liable to generate jam in a location where a tip end of the bill in a direction of conveyance is not given a force of conveyance. In particular, in the case of a bill having both a tear and a small rigidity, that rate, at which an obstacle occurs, becomes sharply high. Accordingly, in order to decrease the occurrence of an obstacle, it is required that bills involving a decrease in rigidity and including a torn portion or portions be discriminated and rejected from an ordinary process. Hereupon, according to the present embodiment, a bill distinguishing device 20 is provided between the receipt/payment opening 4 and the temporary accumulation section 8 as shown in FIG. 1 whereby bills in a bad state are beforehand rejected.

An explanation will be given below to an embodiment of an ATM 1 mounting thereon a bill discriminating device, in which the bill distinguishing device 20 and the discriminating unit 6 are united with each other, and which gives an embodiment of the bill distinguishing device 20.

Figure 2:
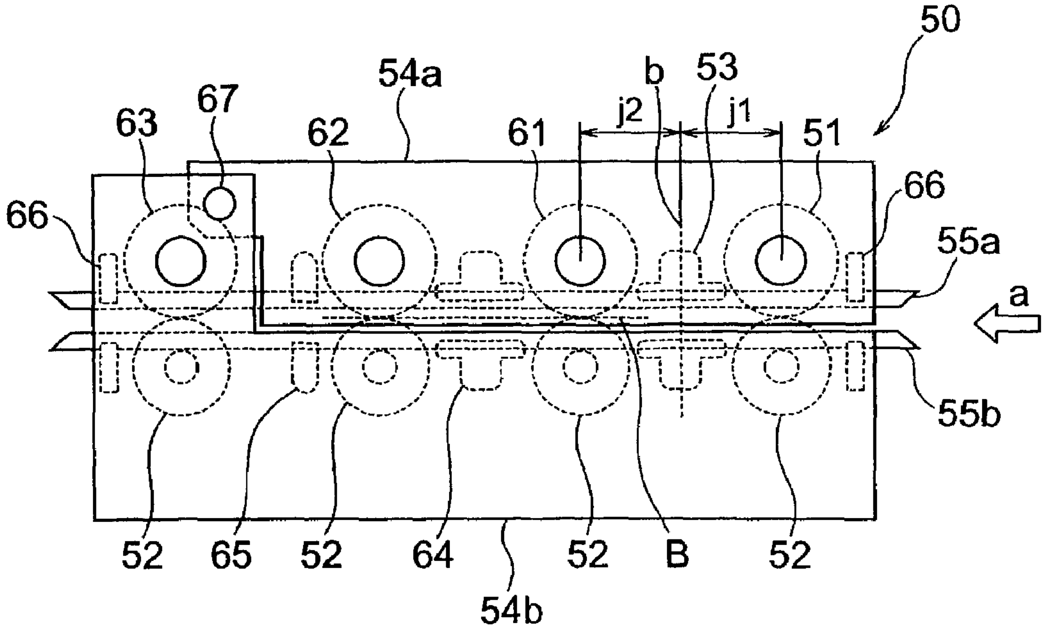
FIG. 2 is a side elevational view illustrating a bill discriminating device, in which a bill distinguishing device and a discriminating unit are united with each other.

FIG. 2 is a side elevational view illustrating a bill discriminating device 50, in which the bill discriminating device 20 and the discriminating unit 6 are united with each other, according to the invention.

In FIG. 2, a bill B is conveyed right and left in the figure between a conveyance guide 55*a* and a conveyance guide 55*b*.

An energizing drive shaft 51 and conveyance drive shafts 61, 62, 63 are arranged in opposition to driven shafts 52. The driven shafts 52 are biased toward the energizing drive shaft 51 by the bias of a spring described later. The energizing drive shaft 51 and conveyance drive shafts 61, 62, 63 are rotatingly driven by a motor (not shown), and the driven shafts 52 are given torque by the energizing drive shaft 51 to rotate. The bill B is interposed between the energizing drive shaft 51 and the conveyance drive shafts 61, 62, 63 and the driven shafts 52 to be conveyed. The energizing drive shaft 51 applies to the bill B a force, which pulls the bill B in a direction perpendicular to conveyance (referred below to as widthwise direction), to convey the bill B while spreading a torn portion or portions of the bill B. Also, the energizing drive means has the function of applying to a bill a force reacting in a horizontal plane in a direction perpendicular to a central axis of the conveyance path.

Image acquiring means 53 is composed of, for example, a combination of a LED and a CCD line sensor, the LED projecting light on the bill B and the CCD line sensor receiving reflected light or transmitted light to get an image of the bill B. A chain line b in FIG. 2 indicates a position where the image is acquired, the position being disposed between the energizing drive shaft 51 and the conveyance drive shaft 61 to be positioned a distance j1 from a center of the energizing drive shaft 51 and a distance j2 from a center of the conveyance drive shaft 61 disposed nearest to the image acquiring means 53. In order to see the torn portion or portions spread by the energizing drive shaft 51, the distance j1 is desirably as small as possible.

Frames 54*a*, 54*b* support the energizing drive shaft 51, the conveyance drive shafts 61, 62, 63, the driven shafts 52, and the conveyance guides 55*a*, 55*b*. The frames 54*a*, 54*b* are joined together by a pivot 67 to be able to turn. This is intended for openability at the time of cleaning and removal of jam in the bill distinguishing device 50, and so the frames are secured together so that the energizing drive shaft 51 and the conveyance drive shafts 61, 62, 63 are brought into pressure contact with the driven shafts 52.

Also, provided in the vicinity of the conveyance guides 55*a*, 55*b* are passage sensing means 66, magnetism measuring means 64, and thickness measuring means 65.

Figure 3:
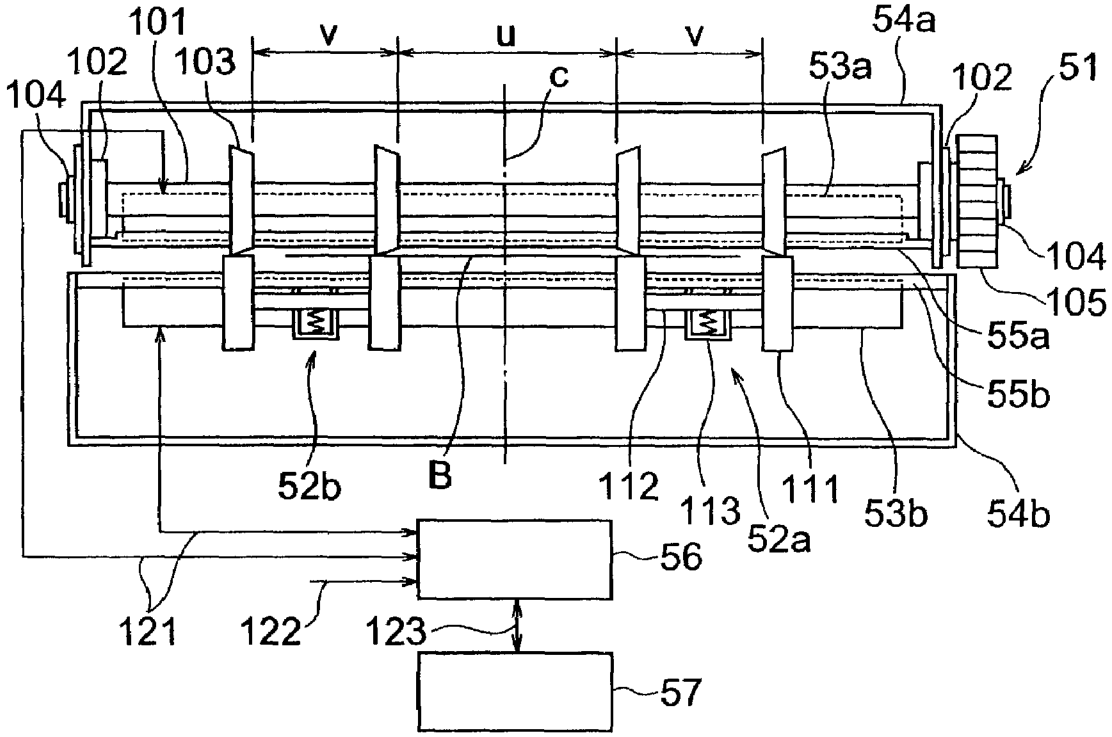
FIG. 3 is a view as viewed in a direction of arrow a in FIG. 2 (mainly showing an energizing drive shaft, driven shafts, and image acquiring means of the bill discriminating device).

FIG. 3 is a view as viewed in a direction of arrow a in FIG. 2 and mainly showing the energizing drive shaft 51, the driven shafts 52, and the image acquiring means 53.

As shown in FIG. 3, the energizing drive shaft 51 is composed of a shaft 101, bearings 102, tapered rollers 103, retaining rings 104, and a gear 105.

The gear 105 is rotatingly driven by a motor (not shown), from which rotation is transmitted to the shaft 101. The tapered rollers 103 are formed of rubber to be bonded to the shaft 101. The tapered rollers 103 are structured to be decreased in diameter toward a center line c of conveyance. The bearings 102 rotatably fixes the shaft 101 to the frame 54*a* and are prevented by the retaining rings 104 from axial movements.

The driven shafts 52, respectively, are composed of driven bearings 111, a shaft 112, and a spring 113. The driven bearings 111 are supported on the shaft 112 and restricted by the conveyance guide 55*b* in axial movements. The spring 113 brings the driven bearings 111 into pressure contact with the energizing drive shaft 51 through the shaft 112.

In the present embodiment, the tapered rollers 103 and the driven bearings 111 are arranged in four sets. Here, it is assumed that u denotes a spacing between a set of the tapered rollers 103 and between the driven bearings 111, which are disposed inside with the center line c of conveyance therebetween, and v denotes spacings between the above set and a set of the tapered rollers 103 and between the driven bearings 111, which are disposed outside the above set, as shown in FIG. 3. The tapered rollers 103 and the driven bearings 111 are arranged in such a manner that the bill B is interposed between and conveyed by the tapered rollers 103 having different directions of inclination. The spacing u and spacing v may assume optional values as far as they are within such range.

Discrimination control means 56 is connected to the image acquiring means 53 via a connection line 121, and also to the magnetism measuring means 64, thickness measuring means 65, and the passage sensing means 66 via a connection line 122. The discrimination control means 56 is composed of electric circuits and software, and has the function of instructing the start of measurement and sensing, and analyzing data acquired in measurement to detect a tear in the bill B.

Also, mechanism control means 57 is composed of electric circuits and software, and has the function of controlling the entire action of the ATM 1, for example, instructing switching of the gates 7A, 7B shown in FIG. 1. The mechanism control means 57 is connected to the discrimination control means 56 via a connection line 123 to give and receive information of a bill.

A typical action of the ATM 1 adopting the above construction is illustrated below.

When a bill B is to be deposited, the bill B is taken in from the receipt/payment opening 4, conveyed on the conveyance path 5 and stored in the temporary accumulation section 8 in a regular conveyance route. Here, in the case where the bill discriminating device 50 shown in FIG. 2 is adopted in place of the discriminating unit 6 and the bill distinguishing device 20 shown in FIG. 1 and a tear is detected in the bill B, the mechanism control means 57 switches the gate 7A toward the receipt/payment opening 4 to return the bill B to the receipt/payment opening 4. Alternatively, in the case where a torn portion or portions are detected in the bill B when the bill is transferred to the accumulation sections 9 from the temporary accumulation section 8, the mechanism control means 57 switches the gates 7A, 7B to store the bill B in the reject accumulation section 10.

An explanation will be given below in detail to the construction and action of the energizing drive shaft 51 with reference to the drawings.

Figure 4:
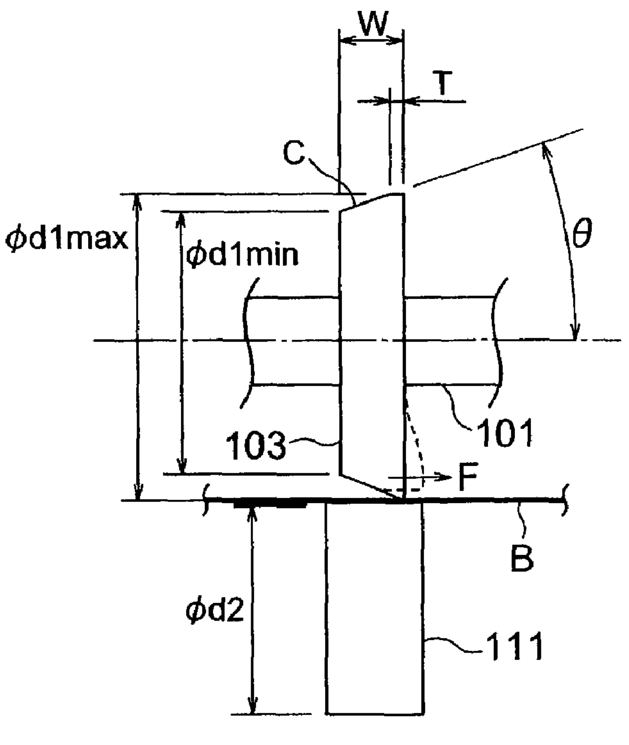
FIG. 4 is a view showing one set of a tapered roller and a driven bearing extracted from the arrangement shown in FIG. 3.

FIG. 4 is a view showing one set of the tapered roller 103 and the driven bearing 111 extracted from the arrangement shown in FIG. 3.

In the constitution shown in FIG. 4, the tapered roller 103 is substantially parallel to the shaft 101 over a width T of an entire width W of an outer peripheral surface thereof, and a tapered surface C is defined over the remainder (W−T) of the width. The tapered roller 103 has a maximum diameter of $\phi$d1 max and is provided with the tapered surface C, which is decreased in diameter toward the center line c of conveyance (see FIG. 3) to have a minimum diameter $\phi$1min and forms an angle θ with the shaft 101. Meanwhile, the driven bearing 111 has an outer peripheral surface substantially in parallel to the shaft 101 and a diameter of $\phi$d2.

When such combination of the tapered roller 103 and the driven bearing 111 is used to convey the bill B, the tapered roller 103 is deformed outwardly of a large-diameter side thereof as shown by dotted line in FIG. 4. This deformation causes a force F shown by an arrow to act on the bill as interposed. Here, the plurality of tapered rollers 103 are arranged in pairs to be decreased in diameter on sides nearer the center line c of conveyance as shown in FIG. 3 whereby forces are generated to pull the bill B toward both sides in the widthwise direction.

Figure 5:
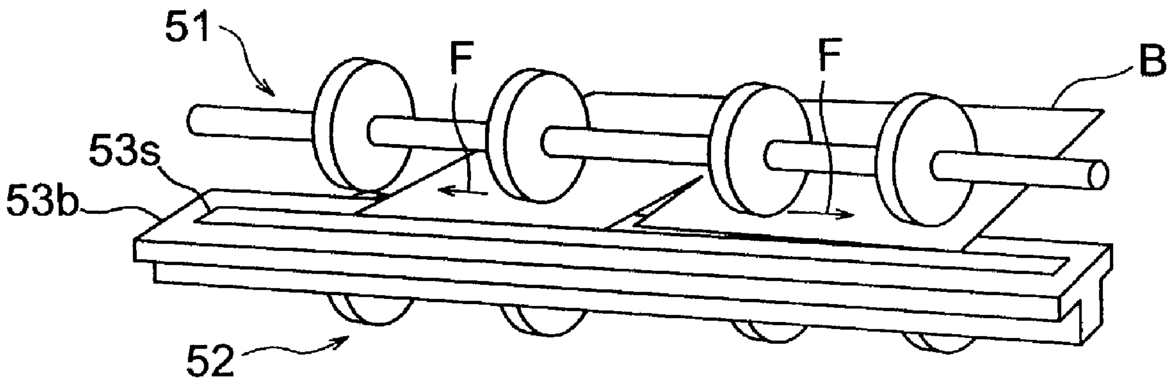
FIG. 5 is a view showing a manner of an energizing drive shaft, image acquiring means, and a bill to illustrate the generation of forces to pull a bill B toward both sides in a widthwise direction.

FIG. 5 is a view showing a manner of the energizing drive shaft 51, the image acquiring means 53*a*, and the bill B at that time. In FIG. 5, an image acquiring window 53*s* is transparent because of a need of acquiring an image of the bill B and provided in a location shown by the two-dot chain line b in FIG. 2.

A torn portion or portions of the bill B are detected in the following manner.

Thus, as shown in FIG. 5, the above-mentioned action of the energizing drive shaft 51 generates forces F tending to pull the bill B toward both sides in the widthwise direction with the result that a torn portion present in the bill B is spread further. When the bill having such torn portion passes the image acquiring window 53*s*, it is possible to discriminate and detect a region where light passing to the image acquiring window 53*b* from the image acquiring window 53*a* is shaded by the bill B and a region where light is transmitted through the torn portion. And in the case where a region permitting transmission of light is measured in a region where light should be shaded, such region can be recognized to define therein a torn portion of the bill.

Figure 6:
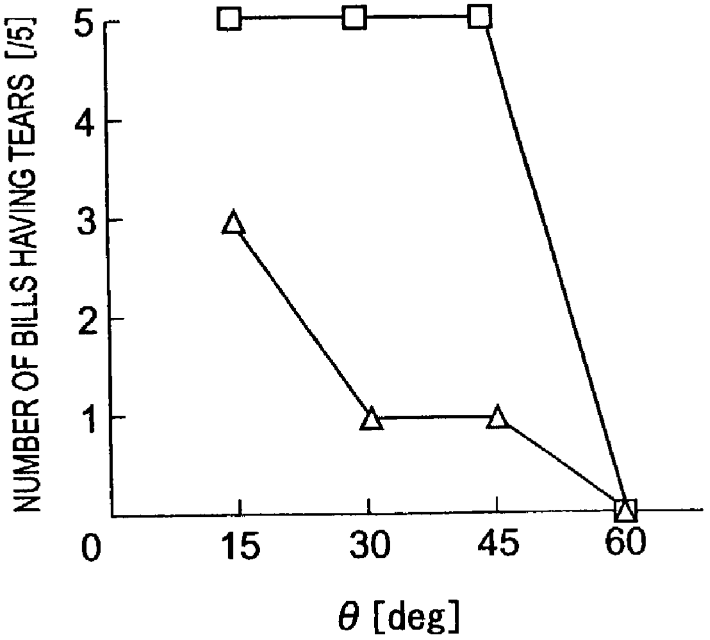
FIG. 6 is a view showing an example of the detection result of a tear.

FIG. 6 is a view showing an example of the detection result of a torn portion detected in this manner. In the figure, the number of bills, in which a tear is detected in the inspection of five bills having a tear, is represented as a function of an angle 0 formed between a tapered surface C of the tapered roller 103 and the shaft 101, and the result of detection in a direction at the time of counting (the receipt/payment opening 4→the temporary accumulation section 8) is indicated by squares (□) while the result of detection in a direction at the time of storage (the temporary accumulation section 8→the receipt/payment opening 4) is indicated by triangles (Δ).

It is seen from FIG. 6 that a torn portion or portions in bills can be detected by means of the energizing drive shaft 51 having the above-mentioned sets of the tapered rollers 103 and the driven bearings 111. In addition, a tear can be spread at an angle θ of the tapered surface C of less than 60° but is not spread at the angle of more than 60° since a state, in which the tapered rollers 103 and the bill B contact with each other, becomes the same as in conveyance rollers. Also, a tear can be spread at a little angle of the tapered surface but taper with a little angle is hard to work and there is the possibility that such taper is gone due to wear in conveyance. Accordingly, the range of θ is desirably $0° < θ < 60°$, and 15° and neighborhood thereof have been found appropriate to be of good performance in detecting a tear.

As described above, bills having a tear can be detected with high accuracy by the use of the bill discriminating device 50 provided with the energizing drive shaft 51, which has the plurality of sets of the tapered rollers and the driven bearings. Further, the provision of such bill discriminating device 50 in ATMs can materialize ATMs capable of decreasing jam caused in bills having been used excessively to have a tear and markedly enhancing reliability.

An explanation will be given below to a modified configuration of the tapered rollers.

Figure 7:
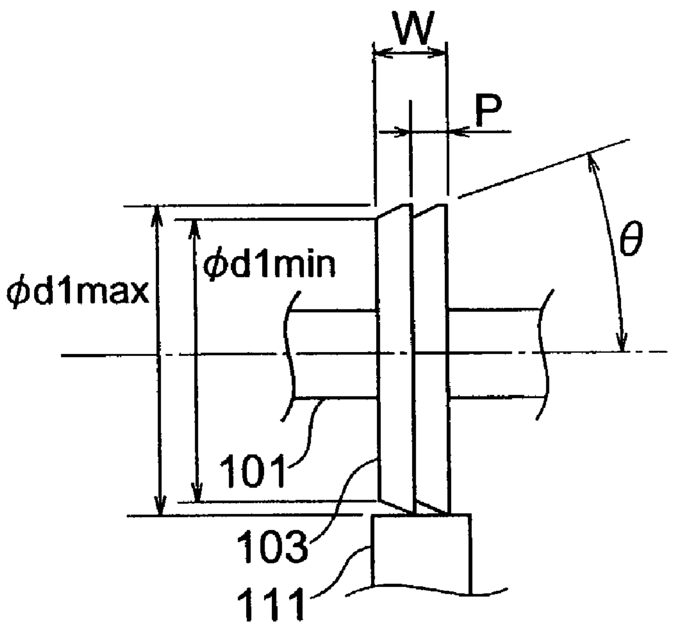
FIG. 7 is a view showing an arrangement, in which a plurality of tapered surfaces are provided on a tapered roller.

While the tapered rollers 103 are shaped to have one tapered surface as shown in FIG. 4, they may be shaped to have two or more tapered surfaces as shown in FIG. 7. FIG. 7 shows an example, in which two tapered surfaces are provided with a spacing P of locations of taper being 2.5 mm. In addition, the spacing P of locations of taper and the number of tapered surfaces are not limited to those described above. Also, the above taper may be such that a plurality of tapered surfaces are provided on one roller or a plurality of tapered rollers each having one tapered surface are provided in a stack.

An explanation will be given below to an advantage achieved by the provision of a plurality of such tapered surfaces.

Figure 8:
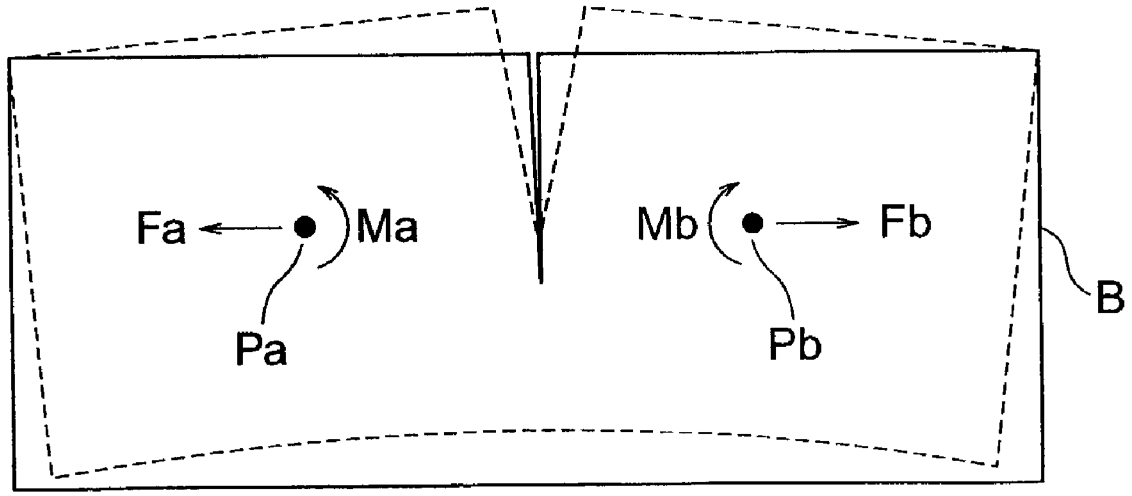
FIG. 8 is a view illustrating forces acting on a bill when tapered rollers having one tapered surface are used to convey a bill.

FIG. 8 is a view illustrating forces acting on a bill when the tapered rollers 103 having one tapered surface are used to convey the bill.

In FIG. 8, black dots Pa, Pb indicate points of interposition between the tapered rollers 103 and the driven bearings 111. As described above, when the tapered rollers 103 are used to convey a bill B, forces Fa, Fb tending to pull the bill B toward both sides in the widthwise direction are generated. Thereby, a tear can be spread.

Since each one of the tapered rollers 103 is subjected to variation in diameter, however, a difference in speed can be generated to cause moments Ma, Mb about the black dots Pa, Pb. Such moments Ma, Mb deform the bill B much as shown by dotted lines, and so it is highly possible that a tear in the bill B become large to lead to breakage or frictional forces on the conveyance guides 55*a*, 55*b* be increased to cause jam.

Figure 9:
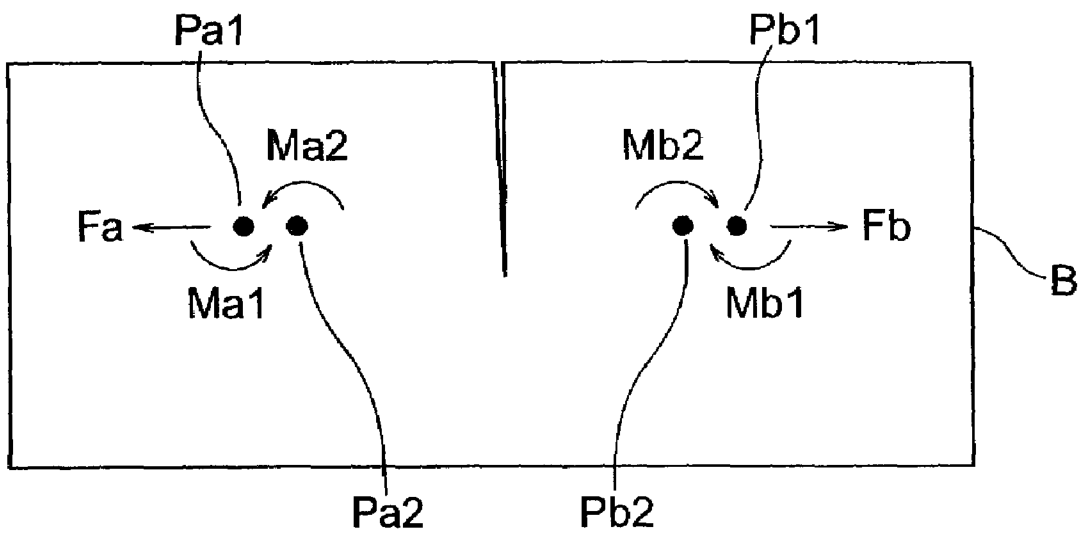
FIG. 9 is a view illustrating moments generated about respective points of interposition in the case where a plurality of tapered surfaces are provided on a tapered roller.

In contrast, in the case where a plurality of tapered surfaces are provided on the tapered roller as shown in FIG. 7, a plurality of sets of points of interposition Pa1, Pa2 and Pb1, Pb2 come out as shown in FIG. 9. At this time, moments each having the same orientation are generated about the points of interposition Pa1, Pa2 and the points of interposition Pb1, Pb2.

Here, since the moments Ma1, Ma2 act in opposite directions in a region between the points of interposition Pa1, Pa2, they have no influence on the entire bill B. Likewise, the moments Mb1, Mb2 act in opposite directions in a region between the points of interposition Pb1, Pb2 to cancel each other, and so have no influence on the entire bill B. As a result, only tensile forces Fa, Fb can be substantially made to act on the bill B.

As described above, a tear can be spread for easy detection by arranging the energizing drive shaft 51, which gives tensile forces for pulling the bill B in the widthwise direction, in the vicinity of the image acquiring means 53.

In addition, the energizing drive shaft 51 is provided in one location in the above embodiment, but may be provided in several locations. For example, the conveyance drive shaft 61 disposed in the vicinity of the image acquiring means 53 can be constructed in the same manner as the energizing drive shaft 51. Thereby, a period of time (or a distance), during which tensile forces act on the bill B, is prolonged, so that it is possible to spread a tear further to enhance the rate of tear detection.

Consideration will be given below to position and shape of a tear in a bill.

In many cases, a location or locations where a tear is present are frequently disposed in a central portion or ends of actual bills where the bills are bent, and tear lengths are various. Also, there exists a problem that detection and rejection of bills having a tear occasionally put a customer to such an inconvenience that it is not possible to deposit bills. Therefore, it is necessary in terms of services to customers to enable depositing bills having a tear in a position free of causing hindrance in the apparatus and bills having a short tear free of causing an obstacle in the apparatus.

Embodiments of such countermeasures in the invention are shown in the following.

Figure 10:
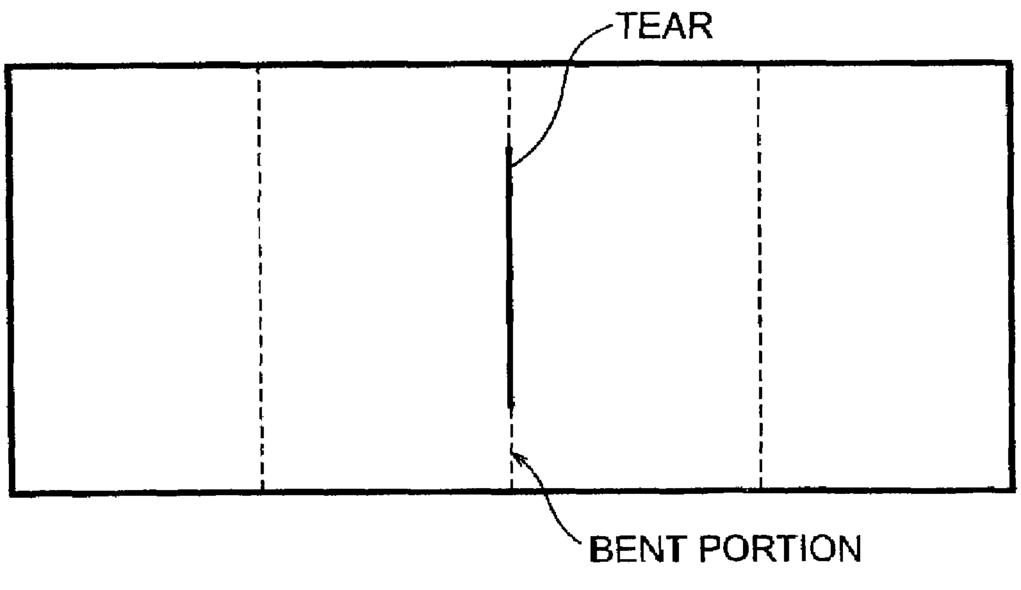
FIG. 10 is a view illustrating a position and size of a tear present in a bill that can be deposited (first configuration).
Figure 11:
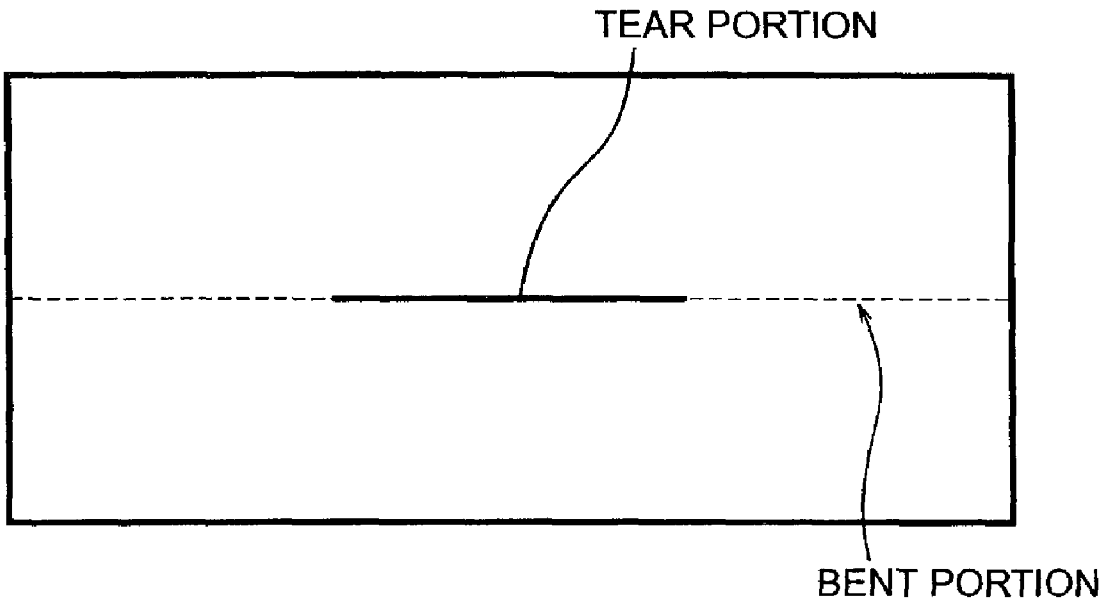
FIG. 11 is a view illustrating a position and size of a tear present in a bill that can be deposited (second configuration).
Figure 12:
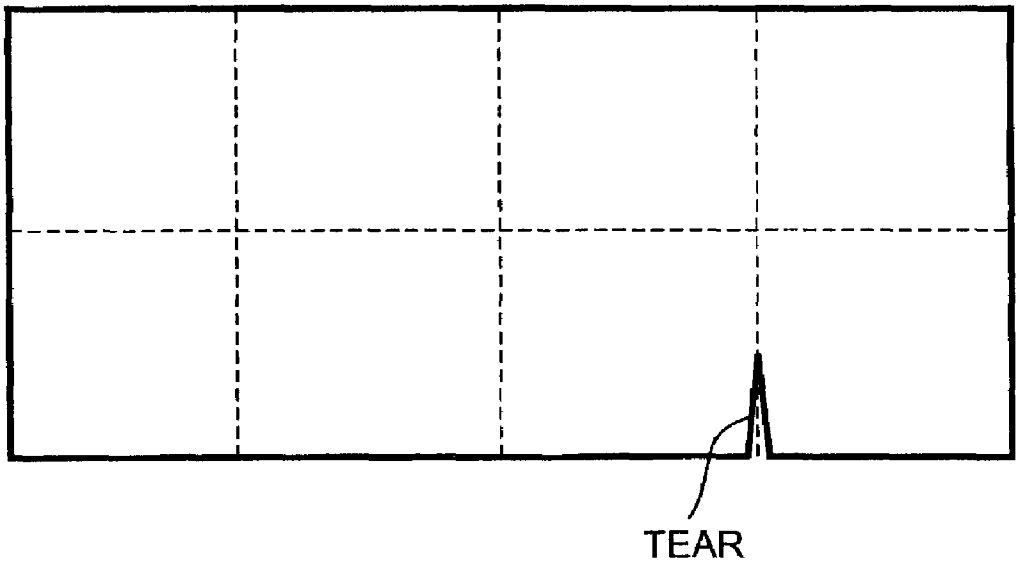
FIG. 12 is a view illustrating a position and size of a tear present in a bill that can be deposited (third configuration).

FIGS. 10 to 12 are views illustrating position and size of a tear in bills that can be deposited.

Thus, a bill having a tear centrally thereof, which tear does not run up to an end of the bill, shown in FIGS. 10 and 11 rarely causes hindrance in the apparatus during transaction. Also, bills, as shown in FIG. 12, having a short tear at a bill end are actually frequently found. Accordingly, in order to reduce an inconvenience to customers, it is desirable to allow depositing these bills at the time of receipt without rejecting them.

However, presently prevailing circulating type ATMs, in which bills deposited by a customer are paid to another customer, involve a problem that payment of bills having a tear gives discomfort to a customer, who receives them. Therefore, it is desired that bills having a tear as shown in FIGS. 10 to 12 be not paid although they can be received.

Hereupon, according to the invention, a region subjected to tear detection is made variable in accordance with an operating mode (counting mode/storing mode) of an ATM to thereby solve the above problem.

(Range Subjected to Detection of a Tear at the Time of Counting)

Figure 13:
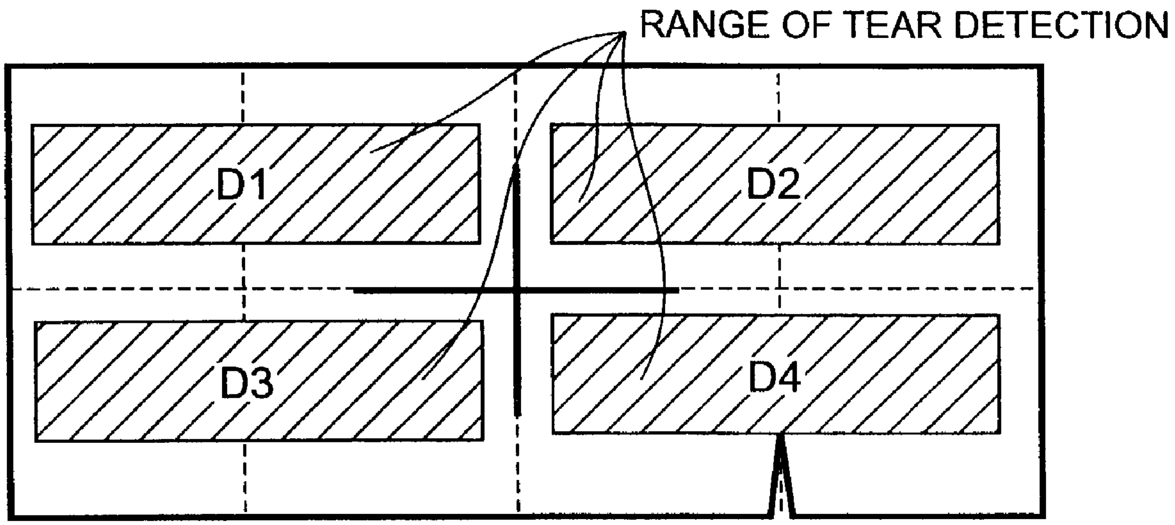
FIG. 13 is a view illustrating ranges, in which a tear is detected at the time of counting (counting mode).

FIG. 13 is a view illustrating a range subjected to detection of a tear at the time of counting.

In the case of a bill having a tear shown in FIGS. 10 to 12, an obstacle rarely occurs during the process of transaction as described above, and such bills are frequent and rejection thereof puts a customer to much inconvenience. Therefore, in order to allow receipt of such bills, a range, in which a tear should be detected at the time of counting, is limited to tear detection ranges D1 to D4 shown in FIG. 13. Thus a tear in bills shown in FIGS. 10 to 12 is not detected and receipt of such bills is made possible.

When a customer puts bills into the receipt/payment opening 4 and the bills thus charged are discriminated by the discriminating unit 6 to be accumulated in the temporary accumulation section 8 (at the time of counting), only bills having a tear not in a central portion and ends as described above but in the tear detection range shown in FIG. 13 are rejected and returned to a customer. This is because bills having a tear in the tear detection range shown in FIG. 13 generally include a lengthy tear and are consequently believed to be liable to cause an obstacle such as jam in the automatic money transaction machine.

(Range of Tear Detection at the Time of Receipt)

Figure 14:
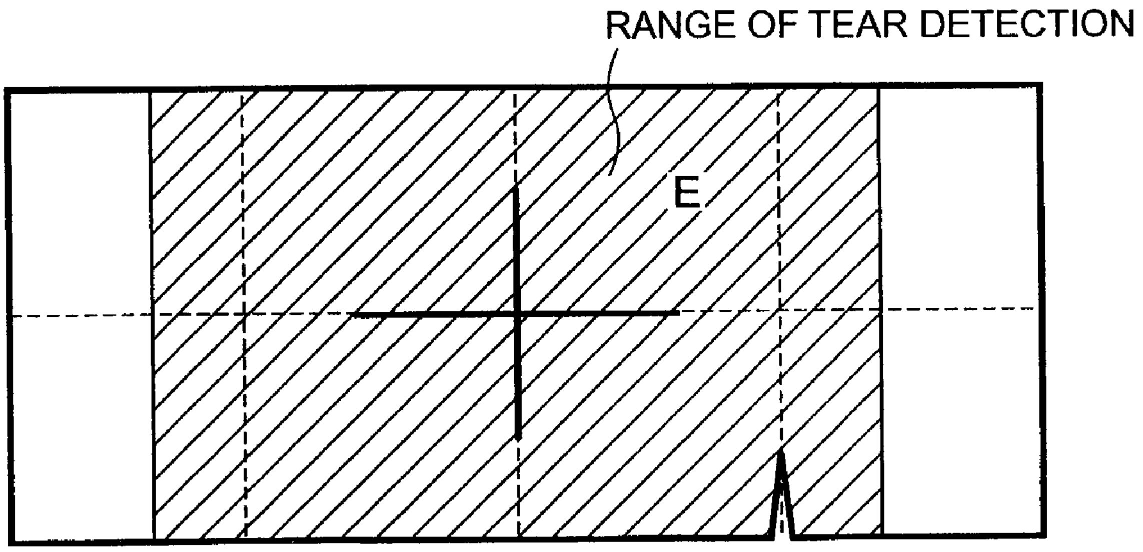
FIG. 14 is a view illustrating a range, in which a tear is detected at the time of storage (storage mode).

FIG. 14 is a view showing a range, in which detection is made for a tear at the time of receipt.

When bills are transferred to the accumulation sections from the temporary accumulation section (at the time of storage) after termination of transaction with a customer, a range, in which the existence of a tear shown in FIG. 14 is determined, is enlarged to a range (E), in which determination can be made by the detection means, and bills, for which the existence of a tear is decided, are transferred to the reject accumulation section 10 and will not be used for payment.

Thus bills having a tear are not used for payment, and so it is possible to prevent giving discomfort to a customer, who receives bills. In addition, it is a matter of course that a range, in which the existence of a tear is determined, is not limited to that in the above embodiment, and it goes without saying that such range can be modified depending upon the constitution and performance of the state judging means and a state of use of bills.

In this manner, a range of tear detection for bills is made variable in accordance with the operating mode (counting mode or storing mode) of the machine whereby it is possible to realize an automatic money transaction machine, in which the rate of an obstacle is decreased and no discomfort is given to a customer, who used the machine.

According to the invention, it is possible to realize an automatic money transaction machine, which is small in size to be able to detect a state of a tear in a bill with good accuracy, and gives good service and no discomfort to a customer.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An automatic money transaction machine for handling bills, comprising:

a receipt/payment opening, at which bills are received and paid;

a discriminating unit for deciding truth or falsehood of bills;

a temporary accumulation section for temporarily storing bills as deposited;

a conveyance path, along which bills are conveyed between the receipt/payment opening and the discriminating unit and the temporary accumulation section;

energizing drive means provided on the conveyance path between the receipt/payment opening and the temporary accumulation section for application of tensile or compressive forces in a direction horizontally perpendicular to a direction of conveyance in a plane of a bill;

bill image acquiring means provided close to the energizing drive means for acquiring an image of a bill, to which tensile or compressive forces are applied by the energizing drive means; and state distinguishing means for distinguishing a state of a bill on the basis of bill image data acquired by the bill image acquiring means.

2. The automatic money transaction machine according to claim 1, wherein a range of bill image data used in distinguishing the state of a bill is variable in accordance with an operating mode of the machine.

3. The automatic money transaction machine according to claim 1, wherein the energizing drive means comprises an energizing drive shaft and a driven shaft, and wherein the driven shaft is brought into pressure contact with the energizing drive shaft to thereby interpose a bill therebetween at two or more locations and convey the bill, and the energizing drive shaft comprises a shaft and rollers mounted on the shaft and having an outer peripheral surface comprising a tapered surface, of which diameter is smaller toward a center of the conveyance path than toward both ends of the conveyance path.

4. The automatic money transaction machine according to claim 1, wherein the energizing drive means comprises an energizing drive shaft and a driven shaft, and wherein the driven shaft is brought into pressure contact with the energizing drive shaft to thereby interpose a bill therebetween at two or more locations and convey the bill, and the energizing drive shaft comprises a shaft and rollers mounted on the shaft and having an outer peripheral surface comprising a plurality of tapered surface, of which diameter is smaller toward a center of the conveyance path than toward both ends of the conveyance path.

5. The automatic money transaction machine according to claim 1, wherein the conveyance path of bills is modified in accordance with the distinguishing result in the state distinguishing means.

6. An automatic money transaction machine for handling bills, comprising:

a receipt/payment opening, at which bills are received and paid;

a storage box for containing bills received at the receipt/payment opening;

a conveyance path connecting between the receipt/payment opening and the storage box, and along which path bills are conveyed; and energizing drive means, which is mounted on the conveyance path and by which forces reacting in a direction perpendicular to a central axis of the conveyance path in a horizontal plane are applied on a bill conveyed from the receipt/payment opening.

7. The automatic money transaction machine according to claim 6, further comprising means for acquiring an image of a bill energized by the energizing drive means.

8. The automatic money transaction machine according to claim 7, further comprising state distinguishing means for distinguishing a state of a bill acquired by the acquiring means.

9. The automatic money transaction machine according to claim 8, further comprising a temporary storage box for temporarily storing bills received at the receipt/payment opening; and wherein the state distinguishing means sets a first discriminating mode when bills are conveyed to the temporary storage box from the receipt/payment opening, and a second discriminating mode when bills are conveyed to the storage box from the temporary storage box, to make the modes different from each other.

10. The automatic money transaction machine according to claim 6, wherein the energizing drive means comprises tapered rollers, of which surface contacting with a bill is tapered in shape.

11. The automatic money transaction machine according to claim 10, wherein the tapered rollers are arranged in plural to align with one another in the perpendicular direction.

12. An automatic money transaction machine for handling bills, comprising:

a receipt/payment opening, at which bills are received and paid;

a temporary storage box for temporarily storing bills received at the receipt/payment opening;

a storage box for containing bills; and energizing drive means for applying to a bill oppositely directed forces reacting in a direction horizontally perpendicular to a direction of conveyance in a plane of the bill when a bill is conveyed to the temporary storage box from the receipt/payment opening, and when a bill is conveyed to the storage box from the temporary storage box.

13. The automatic money transaction machine according to claim 12, wherein the energizing drive means comprises rollers having a tapered surface, by which rollers a bill being conveyed is energized at two points of interposition.

14. The automatic money transaction machine according to claim 12, further comprising a distinguishing unit for distinguishing a state of a tear present in a bill energized by the energizing drive means, and wherein when a tear present in a bill is distinguished in the distinguishing unit to have a value equal to or more than a predetermined value, the bill is rejected.

* * * * *

UNITED STATES PATENT AND TRADEMARK OFFICE

CERTIFICATE OF CORRECTION

PATENT NO. : 7,314,160 B2
APPLICATION NO. : 10/202629
DATED : January 1, 2008
INVENTOR(S) : Kazushi Yoshida et al.

It is certified that error appears in the above-identified patent and that said Letters Patent is hereby corrected as shown below:

ON THE TITLE PAGE:

In Item “(73) Assignee”, please change --Hitachi, Ltd.-- to “Hitachi-Omron Terminal Solutions Corp., Tokyo, (JP)”

Signed and Sealed this
Twenty-sixth Day of July, 2011

David J. Kappos

*Director of the United States Patent and Trademark Office*